United States Patent
Luan et al.

(10) Patent No.: US 12,373,629 B2
(45) Date of Patent: Jul. 29, 2025

(54) METHOD, SYSTEM, APPARATUS, MEDIUM, AND PROGRAM FOR PHYSICAL DESIGN WIRING AND OPTIMIZATION

(71) Applicant: Phytium Technology Co., Ltd., Tianjin (CN)

(72) Inventors: Xiaokun Luan, Tianjin (CN); Wei Huang, Tianjin (CN); Shaoxian Bian, Tianjin (CN); Yu Deng, Tianjin (CN); Jianfeng Jiang, Tianjin (CN); Yongfeng Sun, Tianjin (CN); Zhanzhi Chen, Tianjin (CN); Wenjiang Jin, Tianjin (CN); Cuina Wang, Tianjin (CN); Tao Tang, Tianjin (CN)

(73) Assignee: Phytium Technology Co., Ltd., Tianjin (CN)

( * ) Notice: Subject to any disclaimer, the term of this patent is extended or adjusted under 35 U.S.C. 154(b) by 687 days.

(21) Appl. No.: 17/708,483

(22) Filed: Mar. 30, 2022

(65) Prior Publication Data
US 2022/0318478 A1 Oct. 6, 2022

(30) Foreign Application Priority Data
Mar. 30, 2021 (CN) .......................... 202110343384.7

(51) Int. Cl.
*G06F 30/394* (2020.01)
*G06F 30/398* (2020.01)

(52) U.S. Cl.
CPC .......... *G06F 30/394* (2020.01); *G06F 30/398* (2020.01)

(58) Field of Classification Search
CPC .... G06F 1/3203; G06F 1/3209; G06F 1/3221; G06F 3/0689; G06F 30/392; G06F 1/324;
(Continued)

(56) References Cited

U.S. PATENT DOCUMENTS

| 9,135,375 B1* | 9/2015 | Sood | G06F 30/00 |
| 9,760,672 B1* | 9/2017 | Taneja | G06F 30/39 |
| 9,767,239 B1* | 9/2017 | Buck | G06F 30/337 |

FOREIGN PATENT DOCUMENTS

| CN | 110457849 A | 11/2019 |
| JP | 1173443 A | 3/1999 |
| TW | 518503 B | 1/2003 |

OTHER PUBLICATIONS

Li, Research on evaluation and design method of ultra-large-scale ASIC chip based on advanced technology, University of Electronics Science and Technology of China, Master Thesis for Professional Degree, Jan. 15, 2021, pp. 14-40.
(Continued)

*Primary Examiner* — Binh C Tat
(74) *Attorney, Agent, or Firm* — ANOVA LAW GROUP, PLLC (57) ABSTRACT

An integrated circuit physical design wiring and optimization method includes, in a first physical design wiring process, performing physical design wiring with a weight of each of one or more signal lines set to a first weight and a weight of a clock line set to a second weight, extracting a violation signal line with a time sequence violation during the first physical design wiring process, and in a second physical design wiring process, reperforming physical design wiring on the violation signal line, a remaining signal line other than the violation signal line, and the clock line with the weight of the violation signal line set to a third weight greater than the first weight. The first weight is less than or equal to the second weight.

13 Claims, 3 Drawing Sheets

(58) Field of Classification Search
CPC ...... G06F 3/0625; G06F 3/0634; G06F 30/39; G06F 1/3287; G06F 2119/12; G06F 1/3215; G06F 16/22; G06F 30/327; G06F 30/367; G06F 30/394; G06F 13/4234; G06F 3/0659; G06F 3/0679; G06F 12/0811; G06F 12/0824; G06F 3/061; G06F 9/44557; G06F 11/3051; G06F 11/3058; G06F 12/0246; G06F 21/105; G06F 21/1075; G06F 21/445; G06F 21/602; G06F 2201/81; G06F 2201/835; G06F 2206/1014; G06F 30/398; G06F 9/44505; G06F 3/0613; G06F 3/0661; G06F 1/3228; G06F 13/1657; G06F 13/4059; G06F 2212/1016; G06F 2212/7201; G06F 3/0688; G06F 30/323; G06F 1/3237; G06F 1/325; G06F 1/3259; G06F 1/3271; G06F 1/3275; G06F 30/30; G06F 1/32; G06F 21/32; G06F 21/86; G06F 3/065; G06F 11/261; G06F 12/06; G06F 12/08; G06F 12/0842; G06F 13/1694; G06F 30/31; G06F 30/33; G06F 30/3308; G06F 9/3814; G06F 1/206; G06F 1/3296; G06F 12/0215; G06F 12/0638; G06F 12/0866; G06F 12/12; G06F 16/9538; G06F 16/9577; G06F 2009/4557; G06F 21/107; G06F 21/53; G06F 21/604; G06F 21/6218; G06F 21/645; G06F 21/71; G06F 21/73; G06F 2212/205; G06F 2212/654; G06F 2212/7203; G06F 2212/7208; G06F 2221/2111; G06F 3/068; G06F 30/396; G06F 9/45558; G06F 9/5044; G06F 9/505; G06F 9/5072; G06F 9/5088; G06F 9/5094; H01L 2924/00014; H01L 2224/16225; G01R 31/318357; G01R 31/318364
USPC ................................. 716/126–131, 100–108
See application file for complete search history.

(56) References Cited

OTHER PUBLICATIONS

Han, The Hierarchical Physical Design of a 32-bit CPU Core, Dalian University of Technology, Master Thesis for Professional Degree, Apr. 15, 2018, pp. 1-54.
Liu et al. Research of Clock Tree on 28 nm Techology, Electronics & Packaging, 20(7): 070307.
Zhang et al. Distributed control system time sequence optimization based on FAHP, Computer Integrated Manufacturing System, 21(9), Sep. 2015, p. 2419-2426.

* cited by examiner

METHOD, SYSTEM, APPARATUS, MEDIUM, AND PROGRAM FOR PHYSICAL DESIGN WIRING AND OPTIMIZATION

CROSS-REFERENCES TO RELATED APPLICATION

This application claims priority to Chinese Application No. 202110343384.7 filed on Mar. 30, 2021, the entire content of which is incorporated herein by reference.

TECHNICAL FIELD

The present disclosure generally relates to the integrated circuit field and, more particularly, to a method, system, apparatus, medium, and program for physical design wiring and optimization.

BACKGROUND

With the development of integrated circuit manufacturing technology, a size of an integrated circuit chip continues to shrink, while integration of the chip continues to increase, and design complexity also continues to increase.

A chip design process in an integrated circuit includes front-end functional design and back-end physical implementation. The front-end functional design includes logic design and synthesis. The back-end physical implementation includes chip layout, clock synthesis, and wiring. In a wiring phase of the back-end physical implementation, clock lines and signal lines need to be reasonably wired and optimized, and a requirement of a chip area needs to be satisfied.

It is desired to further improve and optimize the integrated circuit physical design wiring.

SUMMARY

Embodiments of the present disclosure provide an integrated circuit physical design wiring and optimization method. The method includes, in a first physical design wiring process, performing physical design wiring with a weight of each of one or more signal lines set to a first weight and a weight of a clock line set to a second weight, extracting a violation signal line with a time sequence violation during the first physical design wiring process, and in a second physical design wiring process, reperforming physical design wiring on the violation signal line, a remaining signal line other than the violation signal line, and the clock line with the weight of the violation signal line set to a third weight greater than the first weight. The first weight is less than or equal to the second weight. A line with a greater weight is set with a greater line width, associated with a greater line spacing, and/or located at a higher wiring layer during physical design wiring.

Embodiments of the present disclosure provide an integrated circuit physical design wiring and optimization system, including a processor and a storage medium. The storage medium stores a computer-executable program that, when executed by the processor, causes the processor to, in a first physical design wiring process, perform physical design wiring with a weight of each of one or more signal lines set to a first weight and a weight of a clock line set to a second weight, extract a violation signal line with a time sequence violation during the first physical design wiring process, and, in a second physical design wiring process, reperform physical design wiring on the violation signal line, a remaining signal line other than the violation signal line, and the clock line with the weight of the violation signal line set to a third weight greater than the first weight. The first weight is less than or equal to the second weight. A line with a greater weight is set with a greater line width, associated with a greater line spacing, and/or located at a higher wiring layer during physical design wiring.

Embodiments of the present disclosure provide an integrated circuit physical design wiring and optimization apparatus, including a first wiring device, an extraction device, and a second wiring device. The first wiring device is configured to, in a first physical design wiring process, perform physical design wiring with a weight of each of one or more signal lines set to a first weight and a weight of a clock line set to a second weight. The first weight is less than or equal to the second weight. The extraction device is configured to extract a violation signal line with a time sequence violation during the first physical design wiring process. The second wiring device is configured to, in a second physical design wiring process, reperform physical design wiring on the violation signal line, a remaining signal line other than the violation signal line, and the clock line with the weight of the violation signal line set to a third weight greater than the first weight. A line with a greater weight is set with a greater line width, associated with a greater line spacing, and/or located at a higher wiring layer during physical design wiring.

DETAILED DESCRIPTION OF THE EMBODIMENTS

According to embodiments of the present disclosure, examples of the present disclosure are shown in the accompanying drawings. Although the present disclosure is described in connection with embodiments of the present disclosure, the present disclosure is not limited to the described embodiments. On the contrary, the present invention is subjected to the appended claims, which include changes, modifications, and equivalents made within the spirit and scope of the present invention. Method steps described herein may all be implemented by any functional block or functional arrangement. The any functional block or functional arrangement may be implemented as physical or logical entities or a combination thereof.

In an integrated circuit physical design process, physical design wiring and a time sequence analysis may need to be performed on a clock line and a signal line. The clock line is usually given priority, and clock line wiring may be specially set, such as double line width, double spacing, etc. After the clock line is wired, wiring may be performed on other signal lines (data) with only ordinary line width and normal spacing.

However, in practice, a time sequence violation caused by an extra long delay of an ordinary signal line often occurs. In the existing technology, the wiring of the normal signal line may only be adjusted under the condition that the design of the clock line is prioritized and fixed. Thus, the normal signal line may not be adjusted correctly.

In this disclosure, a twice physical design wiring method is provided. After a first physical design wiring is completed, the time sequence analysis may be performed to extract a signal line in a time sequence violation path. During a second physical design wiring, the signal line with the violation and the clock line may be set specially together, such as setting a double line width, a double spacing, a highest wiring layer. With such re-wiring, a better wiring manner may be adopted for the clock line and the signal line with violation so that the violation of the signal line may be eliminated or alleviated, and design requirements such as the chip time sequence and the chip area can be satisfied.

Figure 1:
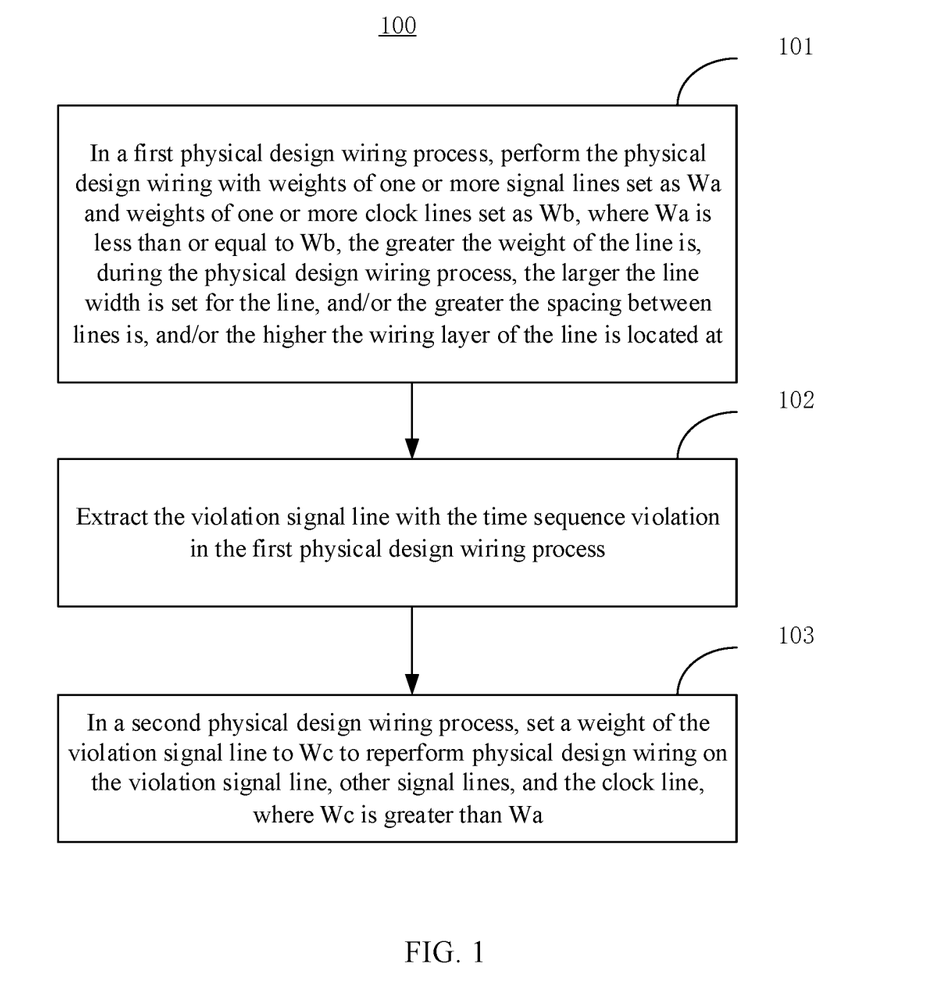
FIG. 1 is a schematic flowchart of an integrated circuit physical design wiring and optimization method according to some embodiments of the present disclosure.

FIG. 1 is a schematic flowchart of an integrated circuit physical design wiring and optimization method 100 according to some embodiments of the present disclosure. The method 100 includes, in a first physical design wiring process, performing the physical design wiring with weights of one or more signal lines set as Wa and weights of one or more clock lines set as Wb (101). Wa may be less than or equal to Wb. The greater the weight of the line is, during the physical design wiring process, the larger the line width is set for the line, and/or the greater the spacing between lines is, and/or the higher the wiring layer of the line is located at. The method 100 further includes extracting (i.e., determining) the violation signal line with the time sequence violation in the first physical design wiring process (102) and, in a second physical design wiring process, setting a weight of the violation signal line to Wc to reperform physical design wiring on the violation signal line, other signal lines, and the clock line (103). Wc may be greater than Wa.

In the first physical design wiring process, the physical design wiring may be performed with the weight of the signal line being set to be less than or equal to the weight of the clock line.

For example, when Wa is smaller than Wb, usually in physical design wiring, since the clock line is an important part of ensuring the time sequence requirement of the entire chip, a wiring weight of the clock line is usually set to be greater than a wiring weight of the signal line. The larger the weight of the line, the larger the line width is set for the line, and/or the larger the spacing between the lines is, and/or the higher the wiring layer where the line is located is during the physical design wiring process. That is, in the physical design wiring, design may be performed in a manner that the clock line is more important. Then, a time sequence analysis may be performed on the chip obtained from the design. Thus, in the time sequence analysis phase, the violation signal line with the time sequence violation during the first physical design wiring process may be extracted.

In some other embodiments, Wa may be equal to Wb. That is, in the first physical design wiring process, the physical design wiring may be performed in a manner that the signal line and the clock line are considered equally important. Then, a time sequence analysis may be performed on the chip obtained from the design. Thus, in the time sequence analysis phase, the violation signal line with the time sequence violation during the first physical design wiring process may be extracted.

If only the normal signal line is adjusted, with the design of the clock line is fixed, as in the existing technology, the normal signal line may not be adjusted in place, or the requirements such as the chip area and time sequence convergence cannot be satisfied no matter how the adjustment is made. In the solution of the present disclosure, not just the violation signal line alone is adjusted or optimized, but in the second physical design wiring, the physical design wiring and optimization may be performed on the violation signal line, the normal signal line, and the clock line together in a manner that violation signal line is considered relatively important. Thus, adjustment and optimization may be performed on all lines as a whole to eliminate the time sequence violation and better satisfy the design requirements of the chip area.

In some embodiments, in the second physical design wiring process, the physical design wiring may be reperformed on the violation signal line, other signal lines, and the clock line with the weight of the violation signal line being to Wc, where Wc is greater than Wa. That is, the weight of the violation signal line is increased, and the global physical design wiring is performed again. As explained above, during the physical design wiring process, the larger the weight of the line is, the larger the line width is set for the line, and/or the larger the spacing between the lines is, and/or the higher the wiring layer where the line is located is. All lines can be adjusted and optimized as a whole by increasing the weight of the violation signal line so that the design requirements such as chip area can be better satisfied when the time sequence violation is eliminated.

The value of the weight of the line may be related to the line width set for the line, the spacing between the lines, and the wiring layer where the line is located. For example, if the weight is 2, the line width is set to double line width, the spacing between lines is double spacing, and the wiring layer is the highest. For example, if the weight is 1.5, the line width is set to 1.5-time line width, the spacing between lines is 1.5-time spacing, and the wiring layer is the second highest. For example, if the weight is 1, the line width is set to single line width, the spacing between lines is single spacing, and the wiring layer where the line is located is the third highest. Such setting may be only one association relationship between the value of the weight and the line width set for the line, the spacing between lines, and the wiring layer where the line is located. In practical application, other association relationships may also be set so that the greater the weight of the line is, the greater the line width is set for the line, and/or the greater the spacing between lines is, and/or the higher the wiring layer where the line is located is.

In some embodiments, when Wa is equal to Wb, in the second physical design wiring process, the physical design wiring may be performed with the weights of one or more clock lines being set to Wd. Wd is greater than Wa and greater than or equal to Wc.

In some embodiments, assume that weights of the signal line and the clock line may be both set to 1 during the first physical design wiring process, that is, Wa=Wb=1. In the second physical design wiring process, the physical design wiring may be reperformed on the violation signal line, other signal lines, and the clock line with the weight of the violation signal line set to Wc, where Wc is greater than a. Assume that Wc is 1.5, the weight of the clock line may be set to a value different from the value in the first physical routing process. That is, the weight of the clock line is changed from 1 to 2, and Wd=2 is greater than Wa=1 and greater than Wc=1.5. That is, in the second physical design wiring process, in addition to increasing the weight of the violation signal line, the weight of the clock line may be also increased so that the weight of the clock line is higher than the weight of the violation signal line. That is, the design requirement of the clock line is satisfied first. Wd may be set to the value of Wc, for example, Wd=Wc=1.5. That is, in the second physical design wiring process, the weight of the violation signal line and the weight of the clock line may be set to be the same value, which is greater than the weight of the normal signal line. That is, the violation signal line and the clock line are equally important and both need to satisfy the design requirements.

In some embodiments, when Wa is smaller than Wb, in the second physical design wiring process, the physical design wiring may be reperformed on the violation signal line, other signal lines, and the clock line with the weight of the violation signal line set to Wc, where Wc is greater than Wa and less than or equal to Wb.

In some embodiments, assume that in the first physical design and wiring process, the weight of the signal line may be set to Wa=1, and the weight of the clock line may be set to Wb=2, that is, Wa<Wb, which means that the physical design wiring may be performed with the weight of clock line set to be higher than that of the signal line. In this case, the physical design wiring and the subsequent time sequence violation should be more in line with an objective situation, i.e., the weight of the clock line should usually be higher. Therefore, in the first physical design wiring process, by increasing the weight of the clock line, the violation signal line in a normal situation may be obtained objectively. In the second physical design wiring process, the physical design wiring may be reperformed on the violation signal line, other signal lines, and the clock line with the weight of the violation signal line set to Wc, where Wc is greater than Wa and less than or equal to Wb. For example, Wc may also be set to 2, that is, Wc>Wa and Wc=Wb=2. That is, the violation signal line and the clock line are equally treated. For example, Wc may also be set to 1.5, that is, Wc>Wa and Wc<Wb, which means that the physical design of the clock line is still the most important. The importance of the violation signal line is lower than the importance of the clock line but still higher than the importance of the normal signal line.

In some embodiments, when Wa is smaller than Wb, in the second physical design wiring process, the physical design wiring may be reperformed on the violation signal line, other signal lines, and the clock line with the weight of the violation signal line set to Wc, where Wc is greater than Wa and greater than Wb.

In some embodiments, assume that in the first physical design wiring process, the weight of the signal line may be set to Wa=1, and the weight of the clock line may be set to Wb=2. In the second physical design wiring process, the physical design wiring may be reperformed on the violation signal line, other signal lines, and the clock line with the weight of the violation signal line set to Wc, where Wc is greater than a and greater than Wb. For example, Wc may also be set to 2.5, that is, Wc>Wa and Wc>Wb, which means that the violation signal line is treated as being more important than the clock line. As such, compared to the clock line and the normal signal line, the design requirement of the violation signal line may be satisfied first.

The above Wa, Wb, Wc, and d may be real numbers. The numbers may also be limited to positive integers, as long as the numbers may reflect a mutual magnitude relationship to indicate levels of weights.

Special wiring requirements of the clock line may also be used on the violation signal line with a high weight, which includes the following requirements.

(1) Long-distance parallel wiring of the clock line and a sensitive signal line needs to be avoided.

(2) The clock line of a single-layer, double-layer, or four-layer board needs to be grounded around with through-holes formed to connect the ground plane evenly.

(3) No more than two through-holes are recommended for the clock line, and forming through-holes in the middle of wiring needs to be avoided.

(4) The clock signal needs to have a good reference plane (the reference plane refers to a plane formed by a reference path in the form of a plane under the signal path, which includes a ground plane or a direct power plane). If the wiring is relatively long, inner layer wiring and strip-shaped line wiring are recommended.

(5) The wiring width of the clock line is maintained as consistent as possible to ensure that wiring resistance matching.

(6) The differential clock wiring needs to be on a same layer and have a same length and consistent wiring spacing. That is, the differential clock wiring should be symmetrical.

(7) Any wiring needs to be avoided in the middle of a differential clock differential pair.

(8) When the clock line wiring changes layers, if the reference plane is changed from a ground layer to another ground layer, ground through-holes are formed near the through-holes of the changed layers.

(9) When the clock line wiring changes layers, if the reference plane is changed from a power plane to a ground plane, a capacitor is added near the through-holes of the changed layers to connect the two planes.

(10) The clock line wiring needs to avoid being divided across the reference plane.

(11) If the clock line wiring is inevitably divided across the reference plane, when the clock line wiring is divided across the ground plane, it is recommended to add a ground line and a ground bridge to connect two ground planes.

(12) When the clock line wiring is divided across the power plane, a decoupling capacitor is added at a position where the clock line wiring is divided across the power plane.

(13) Do not wire other irrelevant lines at a crystal, a crystal oscillator, and clock driving, i.e., in a clock area.

Specific wiring rules may also be formulated according to designer experience. Thus, in the present disclosure, better wiring manner may be applied to the clock line and the violation signal line after the wiring is reperformed by increasing the weight of the violation signal line. Thus, the violation of the signal line may be eliminated or alleviated, and the design requirement such as the chip time sequence and area may be satisfied.

Figure 2:
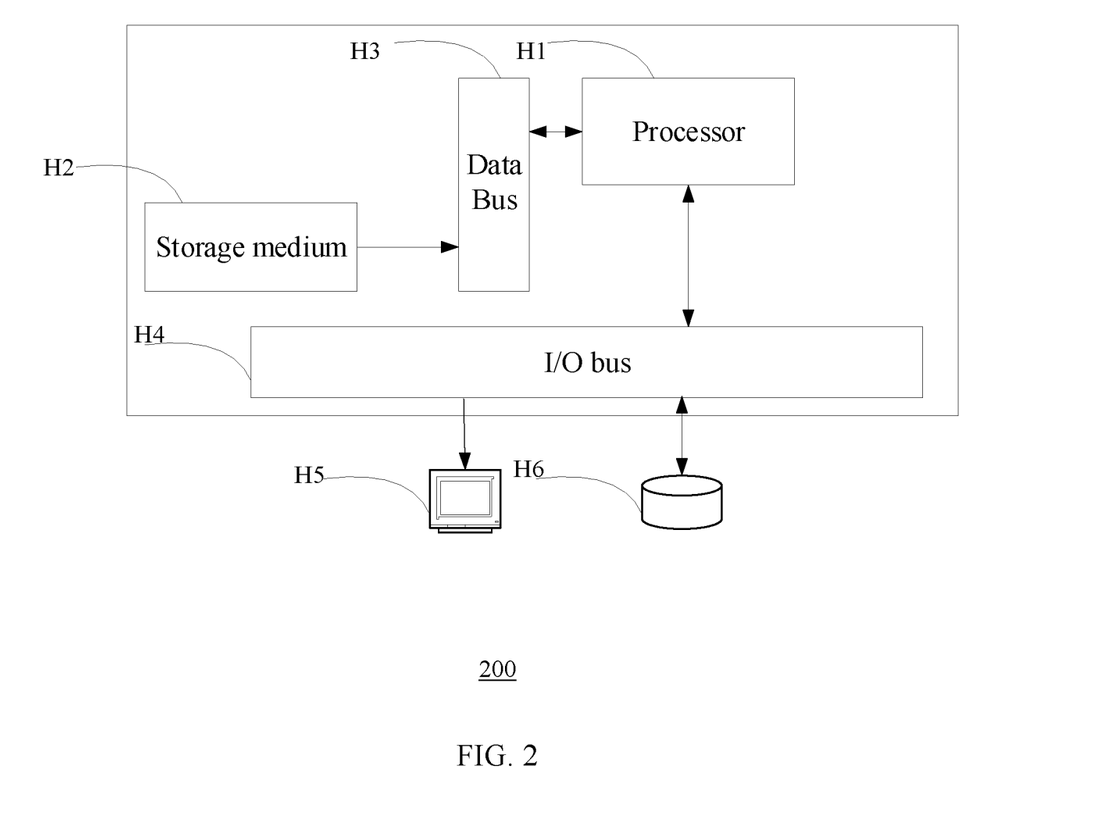
FIG. 2 is a schematic block diagram of an integrated circuit physical design wiring and optimization system according to some embodiments of the present disclosure.

FIG. 2 is a schematic block diagram of an integrated circuit physical design wiring and optimization system 200 according to some embodiments of the present disclosure. The integrated circuit physical design wiring and optimization system 200 includes a processor H1 and a storage medium H2. The storage medium H2 may store a computer-executable program, including computer-executable codes. When the computer-executable codes are executed by the processor, the computer-executable codes cause the processor H1 to, in the first physical design wiring process, perform the physical design wiring with weights of one or more signal lines set to Wa and weights of one or more clock lines set to Wb, where Wa may be less than or equal to Wb. During the physical design wiring process, the greater the weight of the line is, the larger the line width is set for the line, and/or the greater the spacing between lines is, and/or the higher the wiring layer of the line is located at. The processor H1 is further caused to extract the violation signal line with the time sequence violation in the first physical design wiring process and, in the second physical design wiring process, set the weight of the violation signal line to Wc to reperform the physical design wiring on the violation signal line, other signal lines, and the clock line. Wc may be greater than Wa.

In some embodiments, when Wa is equal to Wb, in the second physical design wiring process, the physical design wiring may be performed with the weights of one or more clock lines set to Wd. Wd is greater than Wa and greater than or equal to Wc.

In some embodiments, when Wa is smaller than Wb, in the second physical design wiring process, the physical design wiring may be reperformed on the violation signal line, other signal lines, and the clock line with the weight of the violation signal line set to Wc. Wc is greater than Wa and less than or equal to Wb.

In some embodiments, when Wa is smaller than Wb, in the second physical design wiring process, the physical design wiring may be reperformed on the violation signal line, other signal lines, and the clock line with the weight of the violation signal line set to Wc. Wc is greater than Wa and greater than Wb.

The storage medium H2 may include, but is not limited to, for example, random access memory (RAM), read-only memory (ROM), flash memory, erasable programmable read-only memory (EPROM), electrically erasable programmable read-only memory (EEPROM), a register, a computer storage medium (such as hard disk, floppy disk, solid state drive, removable disc, CD-ROM, DVD-ROM, Blu-ray disc, etc.).

In addition, the computer system also includes a data bus H3, an input/output (I/O) bus H4, a display H5, and input/output devices H6 (e.g., a keyboard, a mouse, a speaker etc.)

The processor H1 may communicate with external apparatuses (H5, H6, etc.) via the I/O bus H4 via a wired or wireless network (not shown).

The storage medium H2 may also store at least one computer-executable instruction, when executed by the processor H1, causes the processor H1 to perform various functions and/or steps of the methods described in embodiments of the present disclosure.

In some embodiments, the at least one computer-executable instruction may also be compiled into or constitute a computer-executable program product. When the one or more computer-executable instructions are executed by the processor, the processor may be caused to perform the various functions and/or steps of the methods described in embodiments of the present disclosure.

Figure 3:
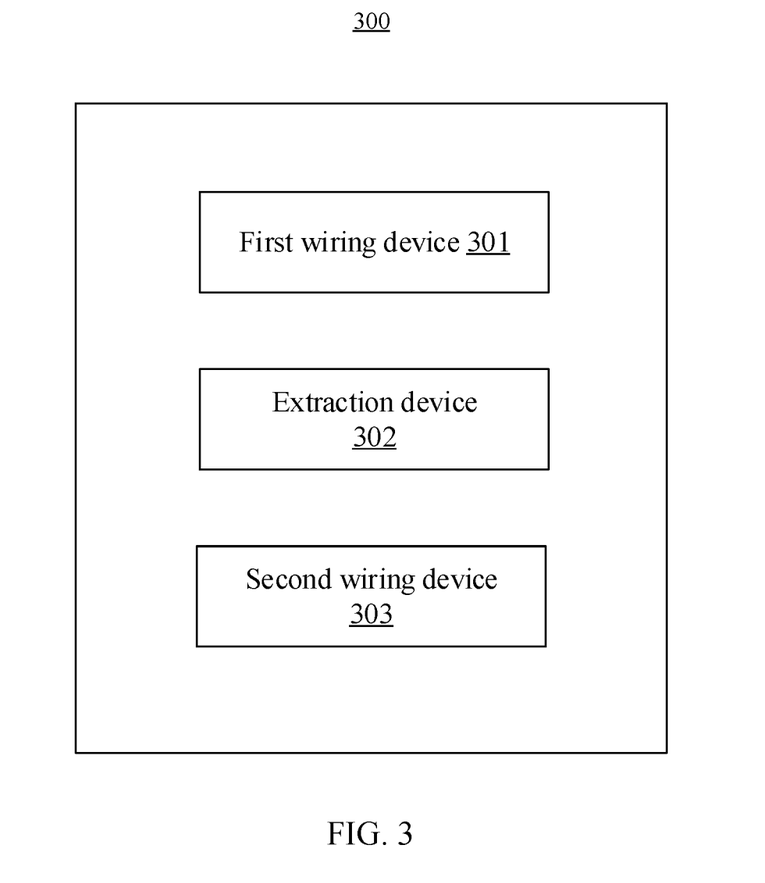
FIG. 3 is a schematic diagram of an integrated circuit physical design wiring and optimization apparatus according to some embodiments of the present disclosure.

FIG. 3 is a schematic diagram of an integrated circuit physical design wiring and optimization apparatus 300 according to some embodiments of the present disclosure. The integrated circuit physical design wiring and optimization apparatus 300 includes a first wiring device 301, an extraction device 302, and a second wiring device 303. In the first physical design wiring process, the first wiring device 301 may be configured to perform the physical design wiring with weights of one or more signal lines set to Wa and weights of one or more clock lines set to Wb, where Wa may be less than or equal to Wb. During the physical design wiring process, the greater the weight of the line is, the larger the line width is set for the line, and/or the greater the spacing between lines is, and/or the higher the wiring layer of the line is located at. The extraction device 302 may be configured to extract the violation signal line with the time sequence violation in the first physical design wiring process. The second wiring device 303 may be configured to, in the second physical design wiring process, set the weight of the violation signal line to Wc to reperform the physical design wiring on the violation signal line, other signal lines, and the clock line. Wc may be greater than Wa.

In some embodiments, when Wa is equal to Wb, in the second physical design wiring process, the second wiring device 303 may be configured to perform the physical design wiring with the weights of one or more clock lines set to Wd. Wd is greater than Wa and greater than or equal to Wc.

In some embodiments, when Wa is smaller than Wb, in the second physical design wiring process, the second wiring device 302 may be configured to reperform the physical design wiring on the violation signal line, other signal lines, and the clock line with the weight of the violation signal line set to Wc. Wc is greater than Wa and less than or equal to Wb.

In some embodiments, when Wa is smaller than Wb, in the second physical design wiring process, the second wiring device 302 may be configured to reperform the physical design wiring on the violation signal line, other signal lines, and the clock line with the weight of the violation signal line set to Wc. Wc is greater than Wa and greater than Wb.

In this solution, a twice physical design wiring method is provided. After the first physical design wiring is completed, the time sequence analysis may be performed to extract a signal line in a time sequence violation path. During the second physical design wiring, the signal line with the violation and the clock line may be set specially together, such as setting a double line width, a double spacing, a highest wiring layer. With such re-wiring, the better wiring manner may be adopted for the clock line and the signal line with violation so that the violation of the signal line may be eliminated or alleviated, and design requirements such as the chip time sequence and the chip area can be satisfied.

Above embodiments are only examples rather than limitations. Those skilled in the art may combine and group some steps and devices from separately described embodiments according to the concept of the present disclosure to achieve the effect of the present disclosure. The combined and grouped embodiments are also included in the present disclosure and are not described here.

Excellences, advantages, effects, etc., mentioned in the present disclosure are only examples and not limitations. These excellences, advantages, effects, etc., should not be considered as necessarily included in embodiments of the present disclosure. In addition, the specific details disclosed above are only for the purpose of example and easy understanding, rather than limiting. The above details do not limit the present disclosure to be implemented by the above specific details.

The block diagrams of elements, devices, apparatuses, and systems associated with the present disclosure are merely illustrative examples and are not intended to require or imply that the elements, devices, apparatuses, and systems must be connected, arranged, or configured in the manner shown in the block diagrams. Those skilled in the art will know that these elements, devices, apparatuses, and systems may be connected, arranged, and configured in any manner. The terms such as "including," "containing," "having," etc., are open-ended terms, which mean "including but not limited to" and are used interchangeably therewith. The terms "or" and "and" used here may refer to and used interchangeably with the term "and/or" unless the context clearly dictates otherwise. The term "such as" used here may refer to and be used interchangeably with the term "such as but not limited to."

The step flowcharts of the present disclosure and the above method descriptions are merely illustrative examples and are not intended to require or imply that the steps of embodiments of the present disclosure must be performed in the order presented. Those skilled in the art will know, the steps of embodiments of the present disclosure may be performed in any order. The terms such as "thereafter," "then," "next," etc., are not intended to limit the order of the steps. These terms are merely used to guide the reader through the description of the method. In addition, any reference to a singular element, e.g., using the terms "a," "an," or "the," should not be construed as limiting the element to the singular.

In addition, the steps and devices in embodiments of the present disclosure are not limited to be implemented in a certain embodiment. In fact, some steps and devices in embodiments of the present disclosure may be combined according to the concept of the present disclosure to achieve new embodiments. These new embodiments are also within the scope of the present disclosure.

The operations of the method described above may be performed by any suitable means capable of performing the corresponding functions. The means may include various hardware and/or software components and/or modules, including but not limited to a hardware circuit, an application-specific integrated circuit (ASIC), or a processor.

A general-purpose processor, a digital signal processor (DSP), an ASIC, a field-programmable gate array signal (FPGA) or another programmable logic device (PLD), a discrete gate or a transistor logic, a discrete hardware assembly, or any combination thereof designed to perform the functions described here may be configured to implement or perform described examples in terms of logic blocks, modules, and circuits. The general-purpose processor may be a microprocessor, but alternatively, the processor may be any processor, controller, microcontroller, or state machine that may be obtained commercially. The processor may also be implemented as a combination of computation apparatuses, such as a combination of a DSP and a microprocessor, a plurality of microprocessors, a microprocessor cooperating with a DSP core, or any other such configuration.

The steps of the method or algorithm described in connection with the present disclosure may be directly embedded in hardware, in a software module executed by a processor, or in a combination thereof. The software module may exist in any form of tangible storage medium. Some examples of the storage medium that may be used include RAM, ROM, flash memory, EPROM, EEPROM, a register, hard disks, removable disks, CD-ROM, etc. The storage medium may be coupled to the processor such that the processor can read information from, and write information to, the storage medium. In some other embodiments, the storage medium may be integrated with the processor. The software module may be a single instruction or a plurality of instructions, and may be distributed over several different code segments, among different programs, and across a plurality of storage media.

The method disclosed here includes actions for implementing the described method. The methods and/or actions may be interchanged with each other without departing from the scope of the claims. That is, unless a specific order of the actions is specified, the order and/or use of the specific actions may be modified without departing from the scope of the claims.

The above functions may be implemented in hardware, software, firmware, or any combination thereof. If being implemented in software, the functions may be stored as instructions on the tangible computer-readable medium. The storage medium can be any available tangible medium that can be accessed by a computer. Through examples and not limitation, the computer-readable medium may include RAM, ROM, EEPROM, CD-ROM or other optical disk storage, magnetic disk storage or other magnetic storage devices, or any other computer accessible tangible medium that is configured to carry or store instructions or expected program codes of the data structure form. For example, the storage medium may include disk and disc that includes compact disc (CD), laser disc, optical disc, digital versatile disc (DVD), floppy disc, and Blu-ray disc, where a disk typically reproduces data magnetically, and a disc reproduces data optically with a laser.

Thus, a computer program product may perform the operations provided here. For example, the computer program product may include a computer-readable tangible medium having instructions physically stored (and/or encoded) on the computer-readable tangible medium. The instructions may be executed by a processor to perform the operations described here. The computer program product may include packaging materials.

Software or instructions may also be transmitted via a transmission medium. For example, the software may be transmitted from a website, server, or another remote source using a transmission medium such as a coaxial cable, a fiber optic cable, a twisted pair, a digital subscriber line (DSL), or wireless technology such as infrared, radio, or microwave.

Furthermore, modules and/or other suitable means for performing the method and technology described here may be downloaded from a user terminal and/or a base station and/or otherwise obtained. For example, such an apparatus may be coupled to a server to facilitate the transfer of the means for performing the method described here. In some embodiments, the methods described here may be provided via a storage medium (e.g., RAM, ROM, a physical storage medium such as CD or floppy disks, etc.). Thus, the user terminal and/or base station may obtain the methods when being coupled to the apparatus or providing the storage medium to the apparatus. Moreover, any other suitable technology for providing the methods and technologies described here to the apparatus may be utilized.

Other examples and implementations are within the scope and spirit of the present disclosure and appended claims. For example, due to the nature of software, the functions described above may be implemented using software executed by a processor, hardware, firmware, hardwiring, or any combination thereof. Features for implementing the functions may also be physically located at various locations. The features may be distributed so that some functions may be implemented at different physical locations. Moreover, as used here, including in the claims, the term "or" used in listing items beginning with "at least one" indicates a separate list. For example, a list of "at least one of A, B, or C" may mean A or B or C, or AB or AC or BC, or ABC (i.e., A and B and C). Moreover, the term "exemplary" does not imply that the described example is preferred or better than other examples.

Various changes, replacements, and modifications may be made to the technologies described here without departing from the technology taught by the appended claims. Moreover, the scope of the claims of the present disclosure is not limited to the specific aspects of the process, machine, manufacture, composition of events, means, methods, and actions described above. A currently existing or later-to-be-developed process, machine, manufacture, composition of events, means, method, or action may be utilized to perform substantially the same function or achieve substantially the same results as the corresponding aspects described here. Thus, the appended claims include such processes, machines, manufacture, compositions of events, means, methods, or actions within the scope of the claims.

The above description of the disclosed aspects may be provided to enable those skilled in the art to make or use the present disclosure. Various modifications to these aspects will be apparent to those skilled in the art. The generic principles defined here may be applied to other aspects without departing from the scope of the present disclosure. Thus, the present disclosure is not intended to be limited to the aspects shown here but conforms to the widest scope consistent with the principles and novel features disclosed here.

The above description has been presented for the purposes of illustration and description. Moreover, the description is not intended to limit embodiments of the present disclosure to the forms disclosed here. Although a plurality of exemplary aspects and embodiments have been discussed above, those skilled in the art may recognize certain variations, modifications, changes, additions, and sub-combinations of the plurality of exemplary aspects and embodiments.

What is claimed is:

1. An integrated circuit physical design wiring and optimization method comprising:
   in a first physical design wiring process, performing physical design wiring with a weight of each of one or more signal lines set to a first weight and a weight of a clock line set to a second weight, the first weight being less than or equal to the second weight;
   extracting a violation signal line with a time sequence violation during the first physical design wiring process; and
   in a second physical design wiring process, reperforming physical design wiring on the violation signal line, a remaining signal line other than the violation signal line, and the clock line with the weight of the violation signal line set to a third weight greater than the first weight;
   wherein:
   the first weight, the second weight, and the third weight reflect importances of the signal lines, the clock line, and the violation signal line in wiring design respectively; and
   a line with a greater weight is set with a greater line width, associated with a greater line spacing, and/or located at a higher wiring layer during physical design wiring.

2. The method according to claim 1, wherein, in response to the first weight being equal to the second weight, in the second physical design wiring process, the weight of the clock line is set to a fourth weight greater than the first weight and greater than or equal to the third weight.

3. The method according to claim 1, wherein the first weight is less than the second weight, and the third weight is greater than the first weight and less than or equal to the second weight.

4. The method according to claim 1, wherein the first weight is less than the second weight, and the third weight is greater than the second weight.

5. A computer-readable storage medium storing a computer executable program that, when executed by a computer, causes the computer to perform the method of claim 1.

6. An integrated circuit physical design wiring and optimization system comprising:
   a processor; and
   a storage medium storing a computer-executable program that, when executed by the processor, causes the processor to:
   in a first physical design wiring process, perform physical design wiring with a weight of each of one or more signal lines set to a first weight and a weight of a clock line set to a second weight, the first weight being less than or equal to the second weight;
   extract a violation signal line with a time sequence violation during the first physical design wiring process; and
   in a second physical design wiring process, reperform physical design wiring on the violation signal line, a remaining signal line other than the violation signal line, and the clock line with the weight of the violation signal line set to a third weight greater than the first weight;
   wherein:
   the first weight, the second weight, and the third weight reflect importances of the signal lines, the clock line, and the violation signal line in wiring design respectively; and
   a line with a greater weight is set with a greater line width, associated with a greater line spacing, and/or located at a higher wiring layer during physical design wiring.

7. The system according to claim 6, wherein, in response to the first weight being equal to the second weight, in the second physical design wiring process, the weight of the clock line is set to a fourth weight greater than the first weight and greater than or equal to the third weight.

8. The system according to claim 6, wherein the first weight is less than the second weight, and the third weight is greater than the first weight and less than or equal to the second weight.

9. The system according to claim 6, wherein the first weight is less than the second weight, and the third weight is greater than the first weight and greater than the second weight.

10. An integrated circuit physical design wiring and optimization apparatus comprising:
    a first wiring device configured to, in a first physical design wiring process, perform physical design wiring with a weight of each of one or more signal lines set to a first weight and a weight of a clock line set to a second weight, the first weight being less than or equal to the second weight;
    an extraction device configured to extract a violation signal line with a time sequence violation during the first physical design wiring process; and
    a second wiring device configured to, in a second physical design wiring process, reperform physical design wiring on the violation signal line, a remaining signal line other than the violation signal line, and the clock line with the weight of the violation signal line set to a third weight greater than the first weight;
    wherein:
    the first weight, the second weight, and the third weight reflect importances of the signal lines, the clock line, and the violation signal line in wiring design respectively; and
    a line with a greater weight is set with a greater line width, associated with a greater line spacing, and/or located at a higher wiring layer during physical design wiring.

11. The apparatus according to claim 10, wherein, in response to the first weight being equal to the second weight, in the second physical design wiring process, the first wiring device is configured to set the weight of the clock line to a fourth weight greater than the first weight and greater than or equal to the third weight.

12. The apparatus according to claim 10, wherein the first weight is less than the second weight, and the third weight is greater than the first weight and less than or equal to the second weight.

13. The apparatus according to claim 10, wherein the first weight is less than the second weight, and the third weight is greater than the first weight and greater than the second weight.

\* \* \* \* \*